United States Patent
Khanka et al.

(10) Patent No.: US 9,049,725 B1
(45) Date of Patent: Jun. 2, 2015

(54) METHOD AND SYSTEM OF USING AN INDICATOR SIGNAL THAT INDICATES WHEN AN ACCESS CHANNEL IS OCCUPIED

(75) Inventors: Bhagwan Khanka, Lenexa, KS (US); Manoj Shetty, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1079 days.

(21) Appl. No.: 12/576,909

(22) Filed: Oct. 9, 2009

(51) Int. Cl.
H04J 11/00 (2006.01)
H04W 74/08 (2009.01)
H04J 13/00 (2011.01)

(52) U.S. Cl.
CPC .............. H04W 74/08 (2013.01); *H04J 13/004* (2013.01)

(58) Field of Classification Search
CPC ..... H04J 13/00; H04J 13/004; H04J 13/0048; H04J 13/12; H04J 13/18; H04W 74/0816; H04W 72/08
USPC ......................................................... 370/209
See application file for complete search history.

(56) References Cited

U.S. PATENT DOCUMENTS

| | | | |
|---|---|---|---|
| 5,231,634 A * | 7/1993 | Giles et al. ..................... | 370/348 |
| 5,537,395 A | 7/1996 | Alles et al. | |
| 6,078,568 A | 6/2000 | Wright et al. | |
| 6,987,982 B2 | 1/2006 | Willenegger et al. | |
| 7,072,316 B2 | 7/2006 | Proctor, Jr. et al. | |
| 7,426,394 B2 | 9/2008 | Rinne | |
| 2002/0051437 A1 * | 5/2002 | Take ............................. | 370/335 |
| 2003/0193888 A1 * | 10/2003 | Sun et al. ...................... | 370/208 |
| 2004/0233870 A1 * | 11/2004 | Willenegger et al. ......... | 370/329 |
| 2008/0076442 A1 | 3/2008 | Ishii et al. | |

FOREIGN PATENT DOCUMENTS

WO 01/47288 A2 6/2001

OTHER PUBLICATIONS

Vijay K. Garg, "IS-95 CDMA and cdma2000," Prentice Hall PTR, 2000, pp. 103-132.
U.S. Appl. No. 12/371,165, titled "Method and System for Zone Based Paging Based on Congestion," filed Feb. 13, 2009.

* cited by examiner

*Primary Examiner* — Huy D Vu
*Assistant Examiner* — Stephen J Clawson

(57) ABSTRACT

A spread spectrum communication system includes a base station that is able to transmit wireless signals that are spread by any of a plurality of orthogonal spreading codes and receive wireless signals that mobile stations transmit in an access channel. One of the orthogonal spreading codes is reserved as an indicator code that the base station uses to indicate when the access channel is occupied by a transmission from a mobile station. When the base station detects a transmission in the access channel, the base station estimates a completion time when the transmission will be completed and transmits an indicator signal spread with the indicator code until the completion time is reached. Before a mobile station transmits a message in the access channel, the mobile station determines whether the access channel is occupied by determining whether the base station is transmitting the indicator signal.

14 Claims, 4 Drawing Sheets

METHOD AND SYSTEM OF USING AN INDICATOR SIGNAL THAT INDICATES WHEN AN ACCESS CHANNEL IS OCCUPIED

BACKGROUND

A mobile station may transmit a message to a base station by transmitting one or more access probes in an access channel. In many cases, the access channel is a shared channel that multiple mobile stations in the base station's wireless coverage area are able to use to transmit messages to the base station. Thus, it may be possible for two or more mobile stations to transmit access probes in the access channel at the same time. This may cause a "collision" between the mobile stations' access probes, which may result in the base station being unable to decode the access probes from either mobile station.

OVERVIEW

In a first principal aspect, an exemplary embodiment provides a method for a base station. The base station is able to transmit wireless signals that are spread by any of a plurality of orthogonal spreading codes and is able to receive signals that mobile stations transmit in an access channel. In accordance with the method, one of the orthogonal spreading codes is reserved as an indicator code. The base station detects a transmission in the access channel. The base station estimates a completion time when the transmission will be completed. The base station transmits an indicator signal spread with the indicator code until the completion time is reached.

In a second principal aspect, an exemplary embodiment provides a method for a mobile station preparing to transmit a message in an access channel to a base station. In accordance with the method, the mobile station determines whether the access channel is occupied by determining whether the base station is transmitting an indicator signal that is spread with a predetermined spreading code. The mobile station waits until the access channel is not occupied before transmitting the message in the access channel.

In a third principal aspect, an exemplary embodiment provides a mobile station. The mobile station comprises a transceiver for receiving forward-link signals spread with any of a plurality of orthogonal spreading codes and for transmitting reverse-link signals, data storage that stores an identification of one of the plurality of orthogonal spreading codes as an indicator code, and a controller for controlling when the transceiver transmits an access probe. The controller is configured to (i) determine whether an access channel of a base station is occupied by determining whether the base station is transmitting an indicator signal spread with the indicator code and (ii) wait until the access channel is not occupied before instructing the transceiver to transmit the access probe in the access channel.

DETAILED DESCRIPTION OF EXEMPLARY EMBODIMENTS

1. Introduction

Figure 1:
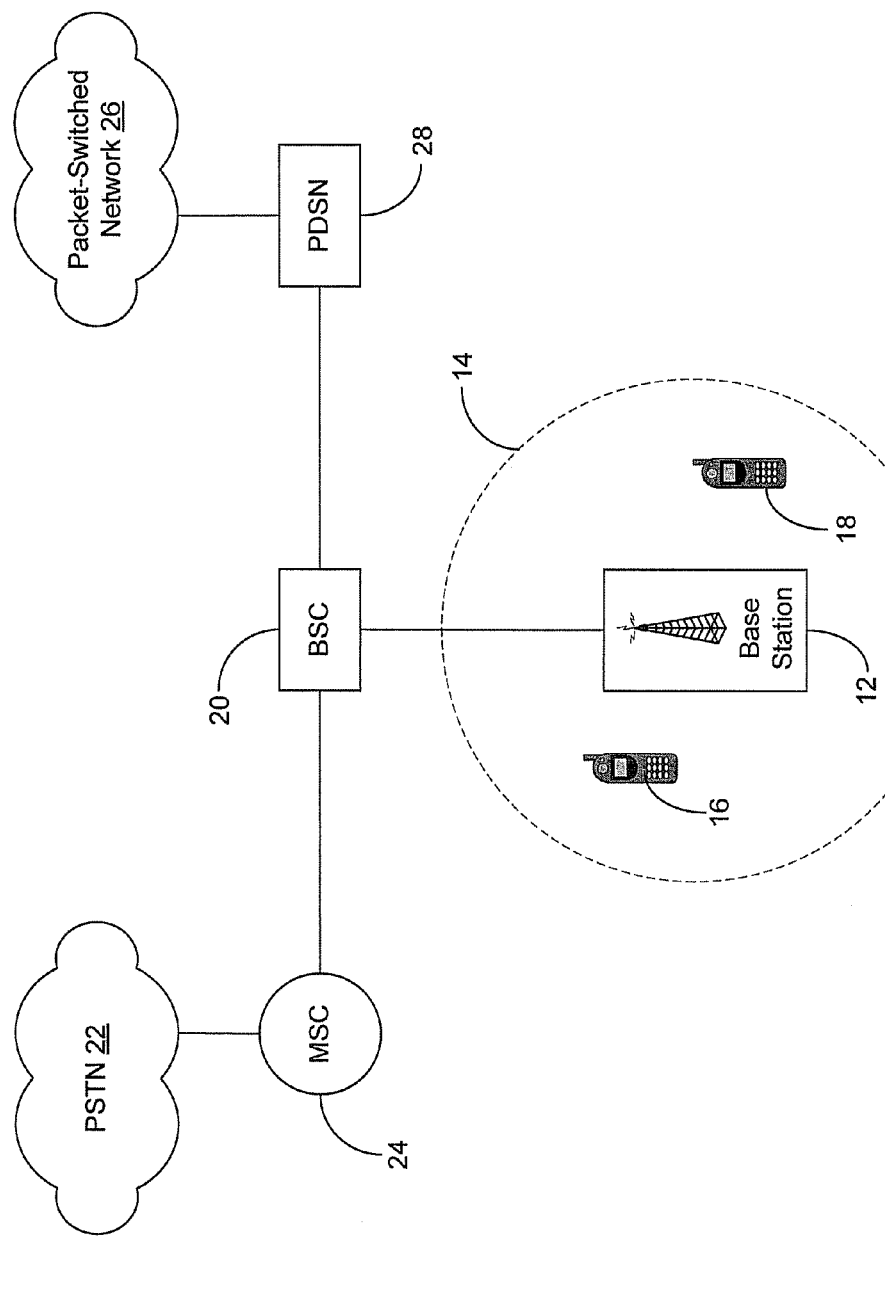
FIG. 1 is a block diagram illustrating a wireless communication system, in accordance with an exemplary embodiment.

A base station may transmit an indicator signal to indicate whether an access channel is occupied, e.g., occupied by a transmission from a mobile station operating in the base station's wireless coverage area. Before a mobile station begins transmitting a message in the access channel, the mobile station may determine whether the access channel is occupied by determining whether the base station is transmitting the indicator signal.

For example, if a mobile station does not detect the indicator signal, the mobile station may determine that the access channel is not occupied and may begin transmitting the message in the access channel. On the other hand, if the mobile station does detect the indicator signal, the mobile station may determine that the access channel is occupied. In that case, the mobile station may wait until the base station stops transmitting the indicator signal before the mobile station begins transmitting the message in the access channel.

In an exemplary embodiment, the base station is part of a spread spectrum communication system and is able to transmit wireless signals that are spread by any of a plurality of orthogonal spreading codes (e.g., Walsh codes). One of the orthogonal spreading codes may be reserved as an indicator code that identifies the indicator signal. Thus, the indicator signal could be any signal that is spread by the indicator code. For example, the indicator signal could be a dummy signal consisting essentially of all digital 1s or digital 0s that is then spread by the indicator code.

The base station may transmit the indicator code when the access channel is occupied and may stop transmitting the indicator signal when the access channel is not occupied (or vice versa). Alternatively, the base station may change the content of the signal spread by the indicator code based on whether the access channel is occupied. For example, the base station may transmit a stream of digital 1s when the access channel is occupied and a stream of digital 0s when the access channel is not occupied (or vice versa).

The base station may periodically monitor the access channel to determine whether the access channel is occupied by a transmission from a mobile station. For example, mobile stations may be configured to begin transmissions in the access channel at designated times, such as the beginning of an access channel cycle. In that case, the base station may check for transmissions at those designated times. If the base station detects a transmission in the access channel, the base station may begin transmitting the indicator signal to indicate that the access channel is occupied.

In an exemplary embodiment, transmissions in the access channel have a predetermined duration. For example, a mobile station may transmit a message in the form of an access probe consisting of a fixed-length preamble and a fixed-length message capsule. In that case, when the base station detects a transmission in the access channel, the base station may estimate a completion time when the transmission will be completed, based on the transmission's predetermined duration. The base station may then transmit the indicator signal until the completion time is reached, so that the time when the indicator signal is being transmitted will substantially correspond to the time when the transmission is occupying the access channel.

Thus, the indicator signal may facilitate an efficient usage of the access channel such that one mobile station uses the access channel at a time. This, in turn, may beneficially reduce the possibility of access probe collisions.

2. Exemplary Wireless Communication System

FIG. 1 is a block diagram illustrating a wireless communication system 10 in which exemplary embodiments may be employed. Wireless communication system 10 includes a base station 12 that provides a wireless coverage area 14. Within wireless coverage area 14, base station 12 is able to wirelessly communicate with mobile stations, such as mobile stations 16 and 18. The mobile stations could be wireless telephones, wireless personal digital assistants (PDAs), wirelessly equipped laptop computers, or other wireless communication devices.

Base station 12 may be controlled by a base station controller (BSC) 20. BSC 20 may, in turn, be communicatively coupled to various networks to route communications to and from base station 12. For example, BSC 20 may be communicatively coupled to the public switched telephone network (PSTN) 22, via a mobile switching center (MSC) 24. Alternatively or additionally, BSC 20 may be communicatively coupled to a packet-switched network 26 via a packet data serving node (PDSN) 28. Thus, mobile stations being served by base station 12 may originate voice calls or receive voice calls from endpoints (such as landline stations or other mobile stations) via PSTN 22. Alternatively or additionally, mobile stations being served by base station 12 may initiate or accept communication sessions with endpoints (such as landline stations, other mobile stations, e-mail servers, Web servers, media servers, or gaming servers) via packet-switched network 26. Such communication sessions may involve the exchange of voice, data, video, or other media.

Although FIG. 1 shows wireless communication system 10 with only one base station and one wireless coverage area (i.e., base station 12 and wireless coverage area 14), it is to be understood that system 10 may include multiple base stations, each with a respective wireless coverage area. The wireless coverage areas of different base stations could be non-overlapping, partially overlapping, or one wireless coverage area could be completely encompassed within another wireless coverage area. In addition, although FIG. 1 shows system 10 with one BSC, one MSC, and one PDSN, system 10 could include a greater or fewer number of these elements. Moreover, base stations (such as base station 12) may be communicatively coupled to PSTN 22 and/or packet-switched network 26 in different ways or may be communicatively coupled to other types of networks.

In an exemplary embodiment, base station 12 and mobile stations operating in wireless coverage area 14, such as mobile stations 16 and 18, communicate using spread spectrum signals, e.g., in accordance with IS-95 CDMA, CDMA2000, or EVDO standards. Thus, base station 12 may be able to transmit wireless signals that are spread by any of a plurality of spreading codes. The spreading codes could be orthogonal spreading codes, such as Walsh codes, and may be used to define different forward-link channels. For example, IS-95 CDMA supports up to 64 Walsh-coded channels for the forward link, using Walsh codes $W_0$ through $W_{63}$. In a conventional IS-95 system, Walsh code $W_0$ is used to identify the pilot channel, Walsh code $W_{32}$ is used to identify the sync channel, one or more of Walsh codes $W_1$ through $W_7$ are used to identify one or more paging channels, and the remaining Walsh codes are used to identify forward traffic channels. In wireless communication system 10, however, one of the available Walsh codes (such as Walsh code $W_{40}$) may be reserved as an indicator code that is used to identify an indicator signal that indicates when the access channel of base station 12 is occupied. Other base stations in system 10 could use either the same Walsh code or a different Walsh code to identify their respective indicator signals.

As described in more detail below, a mobile station operating in wireless coverage area 14 (e.g., mobile station 16 or 18) may communicate with base station 12 by transmitting a message in an access channel of base station 12. A mobile station may transmit a message in an access channel for various reasons, such as to register with system 10, to originate a call, or to respond to a page message. However, before transmitting the message in an access channel, the mobile station may determine whether the access channel is occupied by checking whether base station 12 is transmitting an indicator signal that is spread with a predetermined indicator code (e.g., a Walsh code that base station 12 has reserved as an indicator code).

For example, if mobile station 16 is preparing to transmit a message in the access channel, mobile station 16 may check whether base station 12 is transmitting the indicator signal, e.g., by determining whether there is an appreciable signal that is correlated with the predetermined indicator code. If mobile station 16 determines that base station 12 is not transmitting the indicator signal, mobile station 16 may begin transmitting the message in the access channel, thereby occupying the access channel. Base station 12 may detect this message and responsively transmit the indicator signal to indicate that the access channel is occupied. Mobile station 18 may also be preparing to transmit a message in the access channel. But mobile station 18 may detect that base station 12 is transmitting the indicator signal, indicating that the access channel is occupied (i.e., occupied by the transmission from mobile station 16). In that case, mobile station 18 may wait until base station 12 stops transmitting the indicator signal, as an indication that the access channel is no longer occupied, before transmitting its message in the access channel.

In this way, the indicator signal transmitted by base station 12 may beneficially reduce the possibility that two or more of the mobile stations being served by base station 12 will transmit a message in the access channel at the same time.

3. Exemplary Methods

Figure 2:
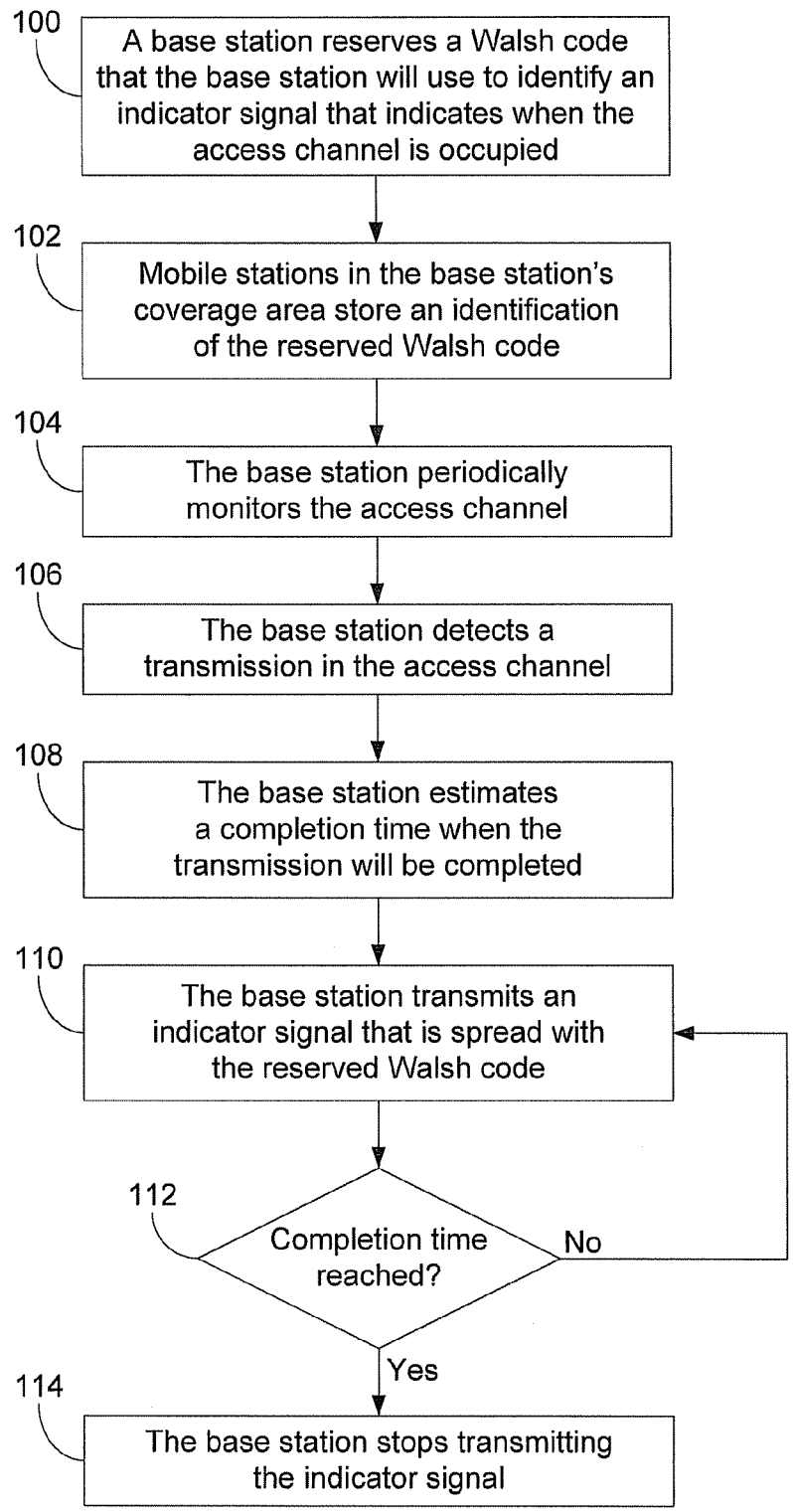
FIG. 2 is a flow chart illustrating a method of operation, in accordance with an exemplary embodiment.
Figure 3:
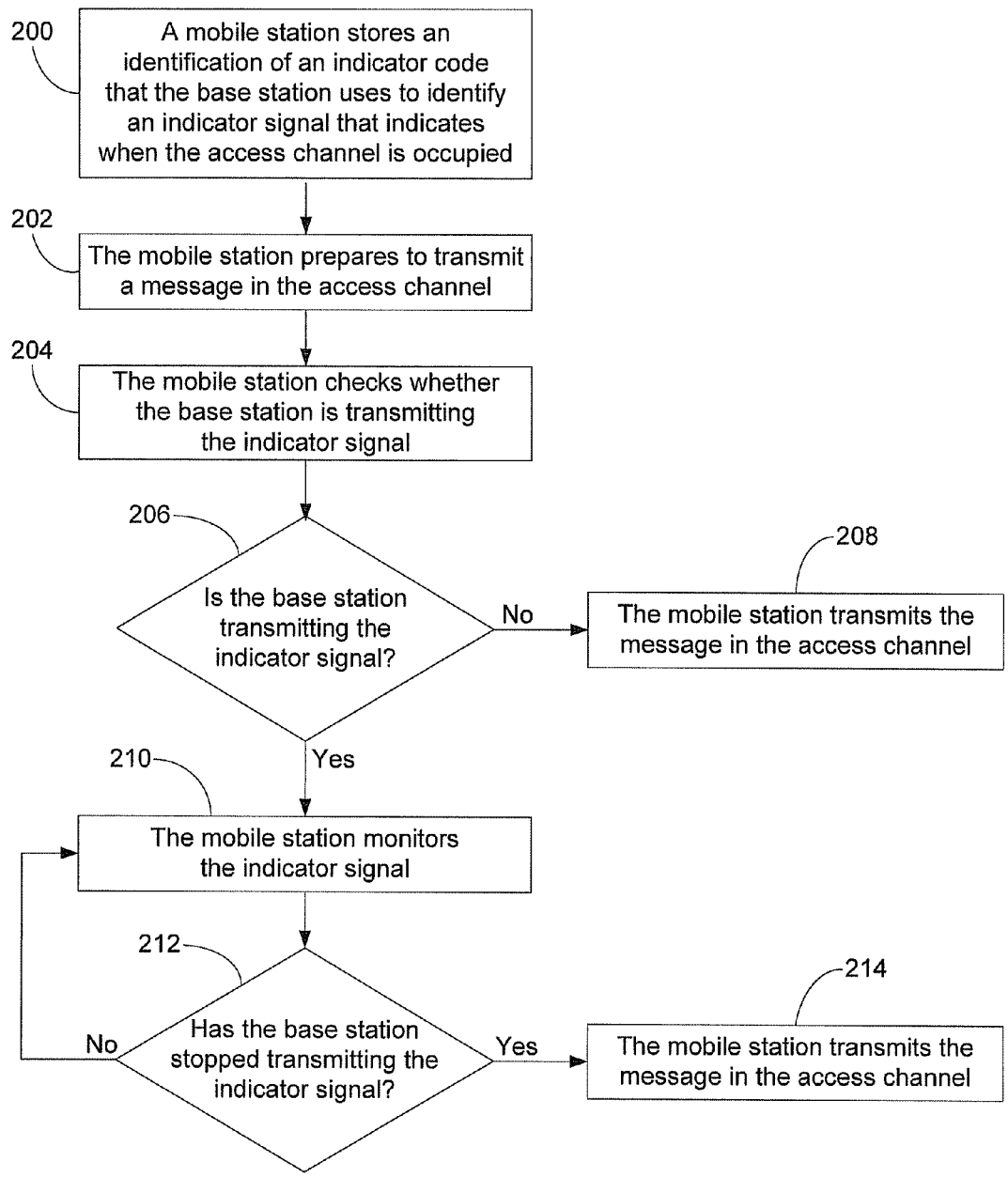
FIG. 3 is a flow chart illustrating a method of operation, in accordance with an exemplary embodiment.

FIGS. 2 and 3 are flow charts illustrating exemplary methods of using indicator signals that indicate whether the access channel of a base station is occupied. For purposes of illustration, FIGS. 2 and 3 are described with reference to wireless communication system 10 shown in FIG. 1 and assume that a Walsh code is used to identify the indicator signal. It is to be understood, however, that other system configurations could be used and that the indicator signal could be identified in other ways.

With reference to FIG. 2, a base station (e.g., base station 12) reserves a Walsh code that the base station will use as an indicator code, i.e., to identify an indicator signal that indicates when the access channel is occupied, as shown by block 100. The Walsh code may be reserved as an indicator code as part of the configuration of the base station, in response to an instruction from a base station controller (e.g., BSC 20), or in other ways. The base station may periodically broadcast an overhead message, e.g., in a paging channel, that identifies the reserved Walsh code. This approach may be advantageous if different base stations use different Walsh codes as indicator codes. Alternatively, the Walsh code used for the indicator code may be standardized.

Mobile stations in the base station's coverage area (e.g., mobile stations 16 and 18) may store an identification of the reserved Walsh code, as shown by block 102. A mobile station may do this after receiving an overhead message from the base station identifying the reserved Walsh code as an indicator code. Alternatively, a mobile station may be provisioned with an identification of the reserved Walsh code upon service activation, or a mobile station may determine the reserved Walsh code in other ways.

The base station periodically monitors the access channel for transmissions from mobile stations, as shown by block 104. In an exemplary embodiment, mobile stations are configured to begin transmitting messages in the access channel at designated times, such as at the beginning of an access channel cycle. Thus, the base station may monitor the access channel at those designated times.

At some point, the base station detects a transmission in the access channel, as shown by block 106. The transmission could be from a mobile station operating in the base station's wireless coverage area (e.g., mobile station 16). Thus, the access channel is now occupied and the base station may transmit the indicator signal to indicate that the access channel is occupied. To determine how long the base station should transmit the indicator signal, the base station may estimate a completion time when the transmission time will be completed, as shown by block 108. The base station may estimate the completion time of the transmission based on the expected duration of the transmission.

For example, transmissions in the access channel may be in the form of access probes having a predetermined duration. In IS-95 CDMA, each access probe consists of a preamble having a fixed length that is defined by the "PAM_SZ" parameter and a message capsule having a fixed length that is defined by the "MAX_CAP_SZ" parameter. Thus, the base station may calculate the completion time when the transmission of the access probe will be completed based on the time when the transmission began and on the values of the PAM_SZ and MAX_CAP_SZ parameters.

If transmissions on the access channel can have a variable length, then the base station may be able to decode the transmission to obtain a message length field from which the duration of the transmission may be calculated. Alternatively, the base station may continue monitoring the transmission in the access channel and continue transmitting the indicator code until the base station detects that the transmission in the access channel has ended. In yet another approach, transmissions in the access channel may have a maximum duration and the base station may estimate the completion time based on this maximum duration.

After determining that the access channel is now occupied, e.g., by detecting a transmission from a mobile station, the base station transmits an indicator signal that is spread by the reserved Walsh code, as shown by block 110. The underlying signal that is spread by the reserved Walsh code (the indicator code) could contain little or no information. For example, the underlying signal could be a dummy signal consisting essentially of all digital 0s or all digital 1s. The indicator signal may be effective simply by having some radio frequency (RF) energy in a signal that is correlated with the reserved Walsh code.

Thus, the indicator signal may be off (no RF energy transmitted with the reserved Walsh code) when the access channel is not occupied and may be on (some RF energy transmitted with the reserved Walsh code) when the access channel is occupied. Alternatively, the "off" state could indicate that the access channel is occupied and the "on" state could indicate that the access channel is not occupied. In other approaches, the base station may transmit RF energy with the reserved Walsh code regardless of whether the access channel is occupied but may change the content of the underlying signal to indicate whether the access channel is occupied. For example, all digital 1s may indicate that access channel is occupied and all digital 0s may indicate that the access channel is not occupied (or vice versa).

Assuming that the base station has estimated a completion time for the transmission in the access channel, the base station may continue transmitting the indicator signal until the completion time is reached, as shown by block 112. When the completion time is reached, the base station stops transmitting the indicator signal, as shown by block 114. To stop transmitting the indicator signal, the base station may stop transmitting RF energy with the reserved Walsh code, or the base station may change the content of the underlying signal (such as by changing the signal from all digital 1s to all digital 0s, or vice versa).

FIG. 3 is a flow chart illustrating an example of how the indicator signal may control wireless communications from a mobile station (e.g., mobile station 16) to a base station (e.g., base station 12). The mobile station stores an identification of an indicator code (e.g., a Walsh code) that the base station uses to identify an indicator signal that indicates when the access channel is occupied, as shown by block 200. The mobile station may store this identification after receiving a transmission from the base station (such as an overhead message transmitted in a paging channel) that identifies a Walsh code that the base station uses as the indicator code. Alternatively, an identification of the indicator code could be provisioned in the mobile station, for example, as part of a service activation process.

At some point, the mobile station prepares to transmit a message in the access channel, as shown by block 202. The mobile station may be preparing to transmit the message in order to register with wireless communication system, to originate a call, to respond to a page message, or for other reasons.

Before transmitting the message, the mobile station checks whether the base station is transmitting the indicator signal, as shown by block 204. To do this, the mobile station may determine whether there is any appreciable signal that is correlated with the indicator code. For example, the mobile station may detect the indicator signal when the mobile station receives a signal that is correlated with the indicator code and has a signal strength that is greater than a threshold.

Whether the mobile begins transmitting the message in the access channel at this time may depend on whether the base station is transmitting the indicator signal, as shown by block 206. If the mobile station determines that the base station is not transmitting the indicator signal, thereby indicating that the access channel is not occupied, then the mobile station may transmit the message in the access channel, as shown by block 208. To do this, the mobile station may transmit one or more access probes in the access channel.

However, if another mobile station (e.g, mobile station 18) is already transmitting in the access channel, then the base station may transmit the indicator signal to indicate that the access channel is occupied. In that case, the mobile station that is seeking to use the access channel (e.g., mobile station 16) may monitor the indicator signal to determine when the access channel is no longer occupied, as shown by block 210. In other words, the mobile station determines whether the base station has stopped transmitting the indicator signal, as shown by block 212. If the base station has not stopped transmitting the indicator signal, then the mobile station may continue monitoring the indicator signal. However, once the mobile station detects that the base station has stopped transmitting the indicator signal (e.g., when the mobile station no longer receives an appreciable signal correlated with the indicator code), then the mobile station may transmit the message in the access channel, as shown by block 214.

In this way, a mobile station may determine whether the access channel of a base station is occupied by determining whether the base station is transmitting an indicator signal that is spread by a predetermined indicator code. If the mobile station is preparing to transmit a message in the access channel, the mobile station may wait until the access channel is not occupied before transmitting the message.

4. Exemplary Mobile Station

Figure 4:
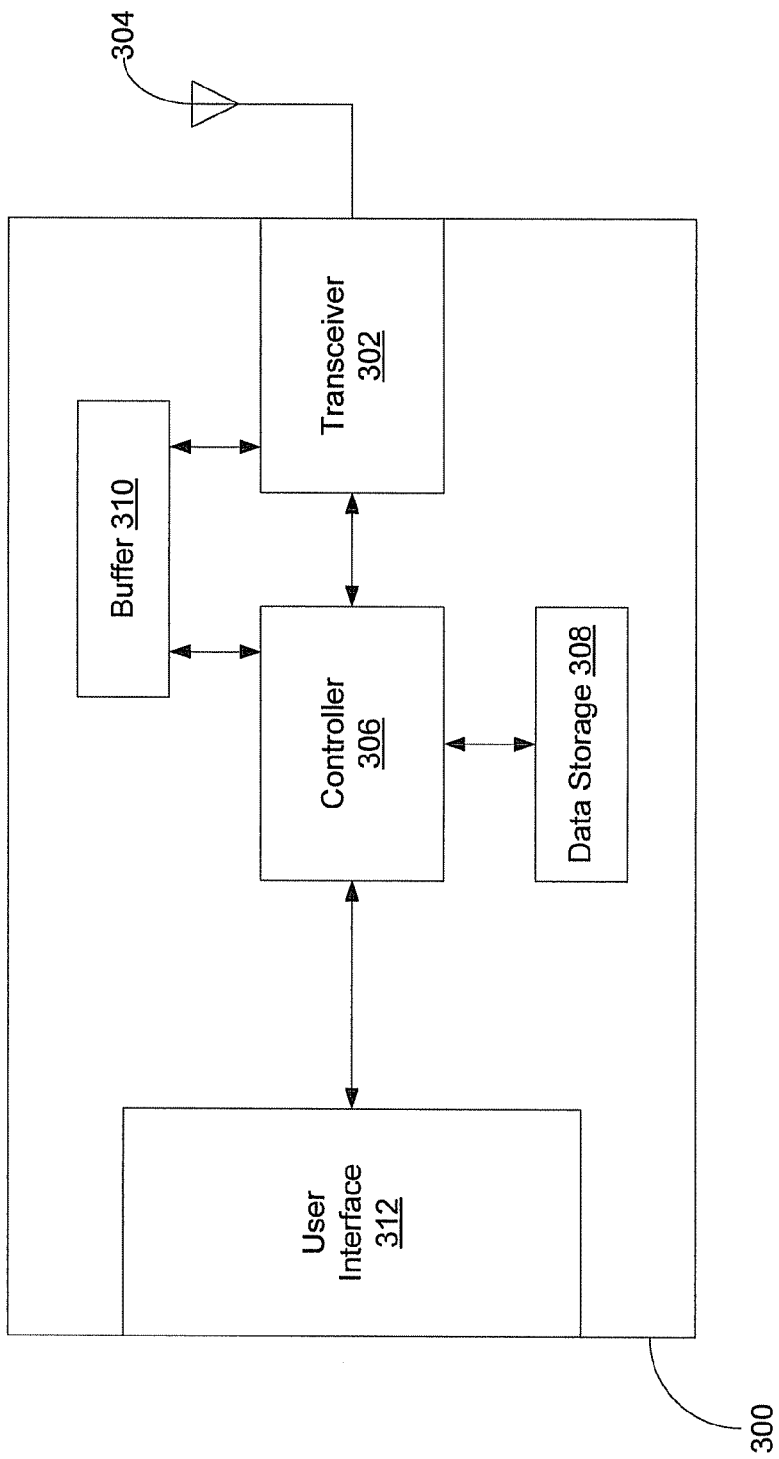
FIG. 4 is a block diagram illustrating a mobile station, in accordance with an exemplary embodiment.

FIG. 4 is a block diagram illustrating an exemplary mobile station 300 that is configured to control its access channel transmissions based on an indicator signal transmitted by the base station. Mobile station 300 includes a transceiver 302 for receiving forward-link signals from the base station and for transmitting reverse-link signals to the base station, for example, via an antenna 304. The forward-link signals may be spread with any of a plurality of orthogonal spreading codes (e.g., Walsh codes). One of the orthogonal spreading codes may be an indicator code that the base station uses to identify an indicator signal that indicates when the access channel is occupied. To recover the underlying signal that has been spread by a given code, transceiver 302 may correlate the received signal with that given code. The reverse-link signals transmitted by transceiver 302 may include messages that are transmitted in an access channel as one or more access probes.

Mobile station 300 may include a controller 306 that controls the functioning of mobile station 300, including when transceiver 302 transmits an access probe in an access channel. For example, controller 306 may be configured to carry out the method illustrated in FIG. 3. Thus, controller 306 may be configured to (i) determine whether an access channel of a base station is occupied by determining whether the base station is transmitting an indicator signal that is spread with the indicator code and (ii) wait until the access channel is not occupied before instructing the transceiver to transmit an access probe in the access channel.

Mobile station 300 may include data storage 308, which may be coupled to or part of controller 306. Data storage 308 may store an identification of the indicator code. Mobile station 300 may also include a buffer 310 that may store a message until it is ready to be transmitted as an access probe. Thus, when mobile station 300 is preparing to transmit a message in the access channel, the message may be stored in buffer 310 until controller 306 determines that the access channel is not occupied and instructs transceiver 302 to transmit the access probe.

Mobile station 300 also includes a user interface 312 through which a user may interact with mobile station 300. User interface 312 may include a speaker and microphone for voice communication and may include a display screen for displaying graphical, textual, or other information to the user. The display screen may also include a touch screen for receiving input from the user. Alternatively or additionally, user interface 312 may include keys, buttons, or other controls for receiving input from the user. For example, a user may interact with user interface 312 in order to instruct mobile station 300 to originate a call.

User interface 312 may be coupled to controller 306, so that in response to a user's instruction to original a call, controller 306 may formulate a call origination message for transmission in the access channel. The call origination message may be stored in buffer 310 until controller 306 determines whether the access channel is occupied. When controller 306 determines that the access channel is not occupied, controller 306 may instruct transceiver 302 to transmit the call origination message as one or more access probes in the access channel. In addition to call origination messages, mobile station 300 may transmit other types of messages in the access channel, and mobile station 300 may do so in response to user input, in response to a signal from the base station (e.g., to respond to a page message from the base station), or for other reasons.

Controller 306 may be implemented as hardware, firmware, and/or software. For example, controller 306 may include a processor that executes software instructions stored in data storage 308. In this way, controller 306 may automatically control when transceiver 302 transmits an access probe.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a base station that is able to transmit wireless signals that are spread by any of a plurality of orthogonal spreading codes and is able to receive wireless signals that mobile stations transmit in an access channel, said method comprising:
    said base station receiving an instruction from a base station controller;
    in response to said instruction, said base station reserving one of said orthogonal spreading codes as an indicator code to indicate that said access channel is occupied;
    said base station detecting a transmission in said access channel after receiving said instruction from said base station controller;
    said base station estimating a completion time when said transmission will be completed;
    said base station continuously transmitting an indicator signal spread with said indicator code until said completion time is reached; and
    said base station stopping transmission of said indicator signal when said completion time is reached.

2. The method of claim 1, wherein said orthogonal spreading codes are Walsh codes.

3. The method of claim 1, wherein said transmission is an access probe from a mobile station.

4. The method of claim 3, wherein said access probe has a predetermined duration.

5. The method of claim 4, wherein said base station estimates said completion time based on said predetermined duration.

6. The method of claim 1, further comprising:
    said base station periodically transmitting an overhead message, wherein said overhead message identifies said indicator code.

7. The method of claim 1, wherein said indicator signal is a dummy signal consisting essentially of all digital 0s or all digital 1s.

8. A method for a mobile station, said method comprising:
    said mobile station receiving an overhead message transmitted by a base station, wherein said overhead message identifies a spreading code that is reserved to indicate access channel occupancy;
    when preparing to transmit a message in an access channel to said base station, said mobile station determining whether said base station is transmitting an indicator signal that is spread with said reserved spreading code;

in response to a determination that said base station is not transmitting said indicator signal, said mobile station transmitting said message in said access channel; and in response to a determination that said base station is transmitting said indicator signal, said mobile station (i) monitoring said indicator signal to determine when said base station stops transmitting said indicator signal, and (ii) transmitting said message in said access channel when said mobile station detects that said base station has stopped transmitting said indicator signal.

9. The method of claim 8, wherein said mobile station transmitting said message in said access channel comprises:

said mobile station transmitting at least one access probe.

10. The method of claim 8, wherein said reserved spreading code is a Walsh code.

11. The method of claim 8, wherein said indicator signal is a dummy signal consisting essentially of all digital 0s or all digital 1s.

12. A mobile station, comprising:

a transceiver for receiving forward-link signals spread with any of a plurality of orthogonal spreading codes and for transmitting reverse-link signals;

data storage that stores an identification of one of said orthogonal spreading codes that is reserved by a base station as an indicator code to indicate occupancy of an access channel of said base station; and a controller for controlling when said transceiver transmits an access probe, wherein said controller is configured to (i) identify said indicator code in an overhead message received from said base station, (ii) determine that said access channel of said base station is occupied when said transceiver detects an indicator signal spread with said indicator code, (iii) instruct said transceiver to monitor said indicator signal spread with said indicator code to detect when said base station stops transmitting said indicator signal, and (iv) wait until said base station has stopped transmitting said indicator signal before instructing said transceiver to transmit said access probe in said access channel.

13. The mobile station of claim 12, wherein said orthogonal spreading codes are Walsh codes.

14. The mobile station of claim 12, wherein said indicator signal is a dummy signal consisting essentially of all digital 0s or all digital 1s.

* * * * *